US006779720B2

(12) United States Patent
Lewis

(10) Patent No.: US 6,779,720 B2
(45) Date of Patent: Aug. 24, 2004

(54) METHOD AND APPARATUS FOR GENERATING A TICKET INCLUDING AN IMAGE OF A PERSON

(75) Inventor: Jon Karl Lewis, Vancouver, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 65 days.

(21) Appl. No.: 09/765,868

(22) Filed: Jan. 19, 2001

(65) Prior Publication Data

US 2002/0096562 A1 Jul. 25, 2002

(51) Int. Cl.[7] .................................................. G06K 5/00
(52) U.S. Cl. ...................... 235/382; 235/375; 235/381; 235/432; 382/118; 705/5; 705/13; 340/5.53; 340/5.83
(58) Field of Search ................................ 340/5.83, 5.2, 340/5.52, 5.53, 5.6, 5.8, 5.82, 5.81, 5.86; 235/380, 375, 382, 382.5, 487, 381, 474; 382/103, 115, 118; 713/201; 705/5, 6, 13, 80, 60, 51, 37, 50; 283/77, 112, 113, 53; 400/61; 380/51; 358/1.12

(56) References Cited

U.S. PATENT DOCUMENTS

| | | | | | |
|---|---|---|---|---|---|
| 5,181,786 | A | * | 1/1993 | Hujink | 400/61 |
| 5,598,477 | A | * | 1/1997 | Berson | 380/51 |
| 5,748,755 | A | * | 5/1998 | Johnson et al. | 382/115 |
| 6,067,532 | A | * | 5/2000 | Gebb | 705/37 |
| 6,137,895 | A | * | 10/2000 | Al-Sheikh | 382/115 |
| 6,345,104 | B1 | * | 2/2002 | Rhoads | 382/100 |
| 6,454,174 | B1 | * | 9/2002 | Sansone | 235/494 |
| 6,496,809 | B1 | * | 12/2002 | Nakfoor | 705/80 |
| 6,498,655 | B1 | * | 12/2002 | Brooks et al. | 358/1.12 |
| 6,505,179 | B1 | * | 1/2003 | Kara | 705/50 |
| 6,538,757 | B1 | * | 3/2003 | Sansone | 358/1.12 |
| 6,695,203 | B2 | * | 2/2004 | Iki et al. | 235/375 |
| 2001/0016825 | A1 | * | 8/2001 | Pugliese, III et al. | 705/5 |
| 2001/0034716 | A1 | * | 10/2001 | Goodwin | 705/60 |
| 2002/0023955 | A1 | * | 2/2002 | Frank et al. | 235/382 |
| 2002/0040346 | A1 | * | 4/2002 | Kwan | 705/51 |
| 2002/0138771 | A1 | * | 9/2002 | Dutta | 713/202 |
| 2003/0111530 | A1 | * | 6/2003 | Iki et al. | 235/382 |
| 2003/0150922 | A1 | * | 8/2003 | Hawes | 235/494 |
| 2003/0179903 | A1 | * | 9/2003 | Rhoads | 382/100 |
| 2003/0213842 | A1 | * | 11/2003 | Jackson | 235/380 |
| 2003/0213843 | A1 | * | 11/2003 | Jackson | 235/382 |
| 2004/0052403 | A1 | * | 3/2004 | Houvener | 382/115 |
| 2004/0052404 | A1 | * | 3/2004 | Houvener | 382/115 |

FOREIGN PATENT DOCUMENTS

| | | | |
|---|---|---|---|
| DE | 198 23 907 A1 | * | 12/1999 |
| EP | 1 134 710 A2 | * | 9/2001 |
| WO | WO 01/50445 A1 | * | 7/2001 |
| WO | WO 01/975175 A1 | * | 12/2001 |
| WO | WO 02/28629 A1 | * | 4/2002 |

OTHER PUBLICATIONS

Hewlett–Packard Company patent application; Ser. No. 09/472636; "A System And Method For Authentication Of Electronic Messages Sent To A Network Server"; Filed on Dec. 27, 1999.

* cited by examiner

*Primary Examiner*—Jared J. Fureman
(74) *Attorney, Agent, or Firm*—Gregg W. Wisdom

(57) ABSTRACT

A first embodiment of a ticket generating apparatus includes a computer coupled to a server through a network and a printer coupled to the computer. A purchaser initiates a ticket purchase transaction through the network by accessing a website stored on the server. After completing the ticket purchase transaction the purchaser's computer sends image data corresponding to the image of a person to the server. The server combines the image data with text and graphics data generated by the server to form ticket data. The ticket data is sent over the network to the computer. The computer sends the ticket data to the printer to form the ticket including an image of the person. In a second embodiment of the ticket generating apparatus, the printer is coupled to the network and receives the ticket data directly from the server to form the ticket including an image of the person.

8 Claims, 6 Drawing Sheets

METHOD AND APPARATUS FOR GENERATING A TICKET INCLUDING AN IMAGE OF A PERSON

FIELD OF THE INVENTION

This invention relates to a method and apparatus of providing tickets over a network. More particularly, this invention relates to the generation of an enhanced security ticket over a network.

BACKGROUND OF THE INVENTION

Tickets are used to control admission to a wide variety of events such as concerts, plays, sports contests, and other performances. These tickets could be delivered over a network, such as the Internet. A potential problem with the delivery of tickets over a network involves the creation of multiple copies of the ticket. The ticket receiver might be able to make multiple copies of the ticket delivered over the network. These multiple copies of the ticket might be used to improperly permit parties, in addition to the rightful ticket purchaser, to enter the event for which the ticket was purchased. This problem is particularly great when the event for which the ticket was issued is a general admission event. That is, specific tickets are not issued for specific seats at the location at which the event is conducted. A need exists for a method and apparatus to generate tickets that will reduce the likelihood of improperly admitting people into an event.

SUMMARY OF THE INVENTION

Accordingly, a method of generating a ticket includes requesting ticket data using a network. The method further includes sending ticket data corresponding to the ticket using the network, where the ticket data includes identification data corresponding to an image of a person. In addition, the method includes receiving the ticket data through the network and forming the ticket, including the image, using the ticket data.

A ticket generating apparatus for use with a network includes a first network enabled device coupled to the network and arranged to receive ticket data through the network. The ticket generating apparatus further includes a second network enabled device coupled to the network and arranged to send the ticket data to the network, with the ticket data including identification data corresponding to an image of a person. In addition, the ticket generating apparatus includes an imaging device coupled to the first network enabled device and arranged to receive the ticket data to form the ticket on media including the image.

A ticket generating apparatus for use with a network includes a first network enabled device coupled to the network and arranged to send ticket data to the network, with the ticket data including identification data corresponding to an image of a person. Additionally, the ticket generating apparatus includes a second network enabled device coupled to the network and arranged to receive the ticket data through the network and configured to form the ticket on media including the image.

DESCRIPTION OF THE DRAWINGS

A more thorough understanding of embodiments of the ticket generating apparatus may be had from the consideration of the following detailed description taken in conjunction with the accompanying drawings in which:

Shown in FIG. 1 is a simplified block diagram of a first embodiment of the ticket generating apparatus.

Figure 2:
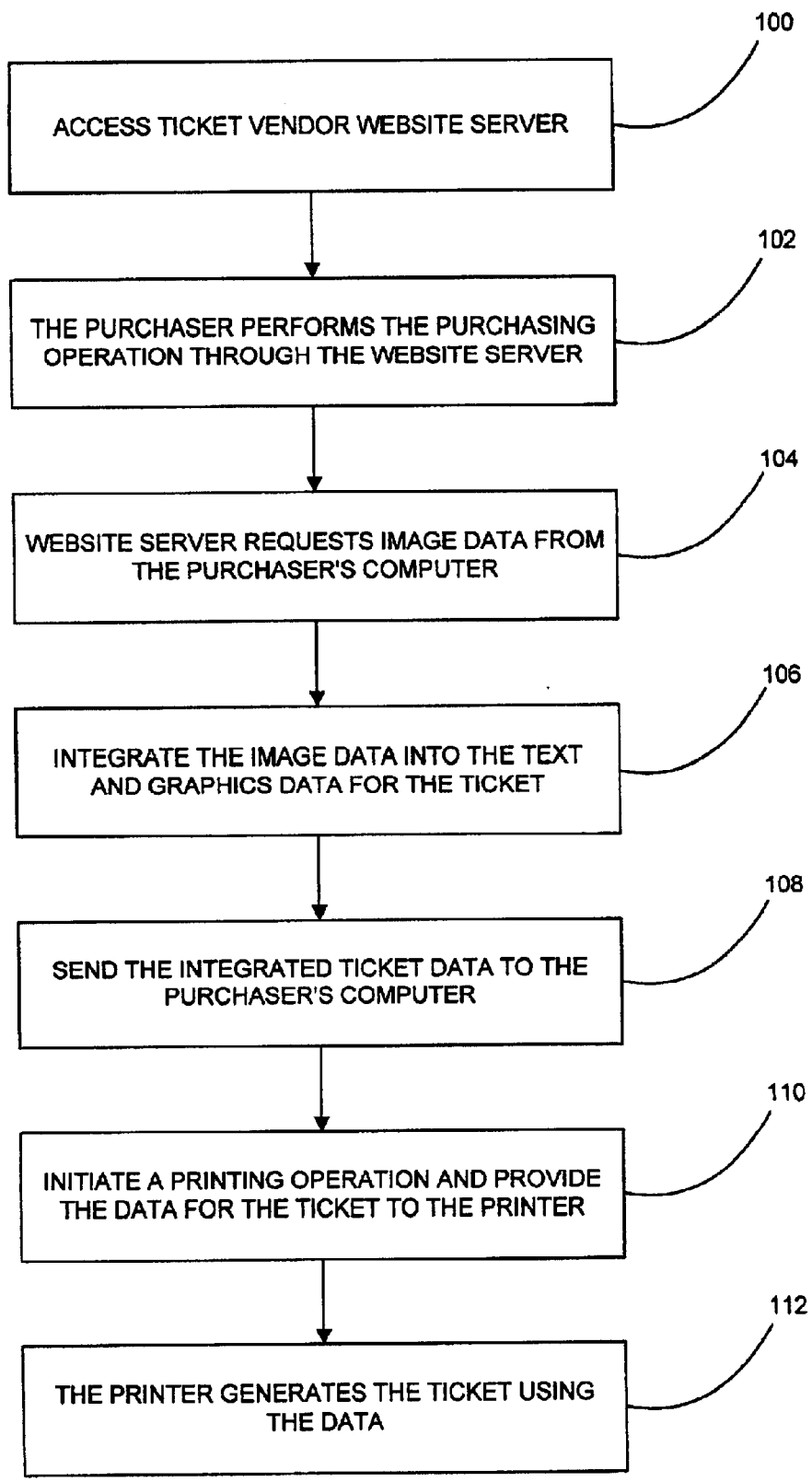

Shown in FIG. 2 is a high level flow diagram of a method for using the first embodiment of the ticket generating apparatus.

Figure 3:
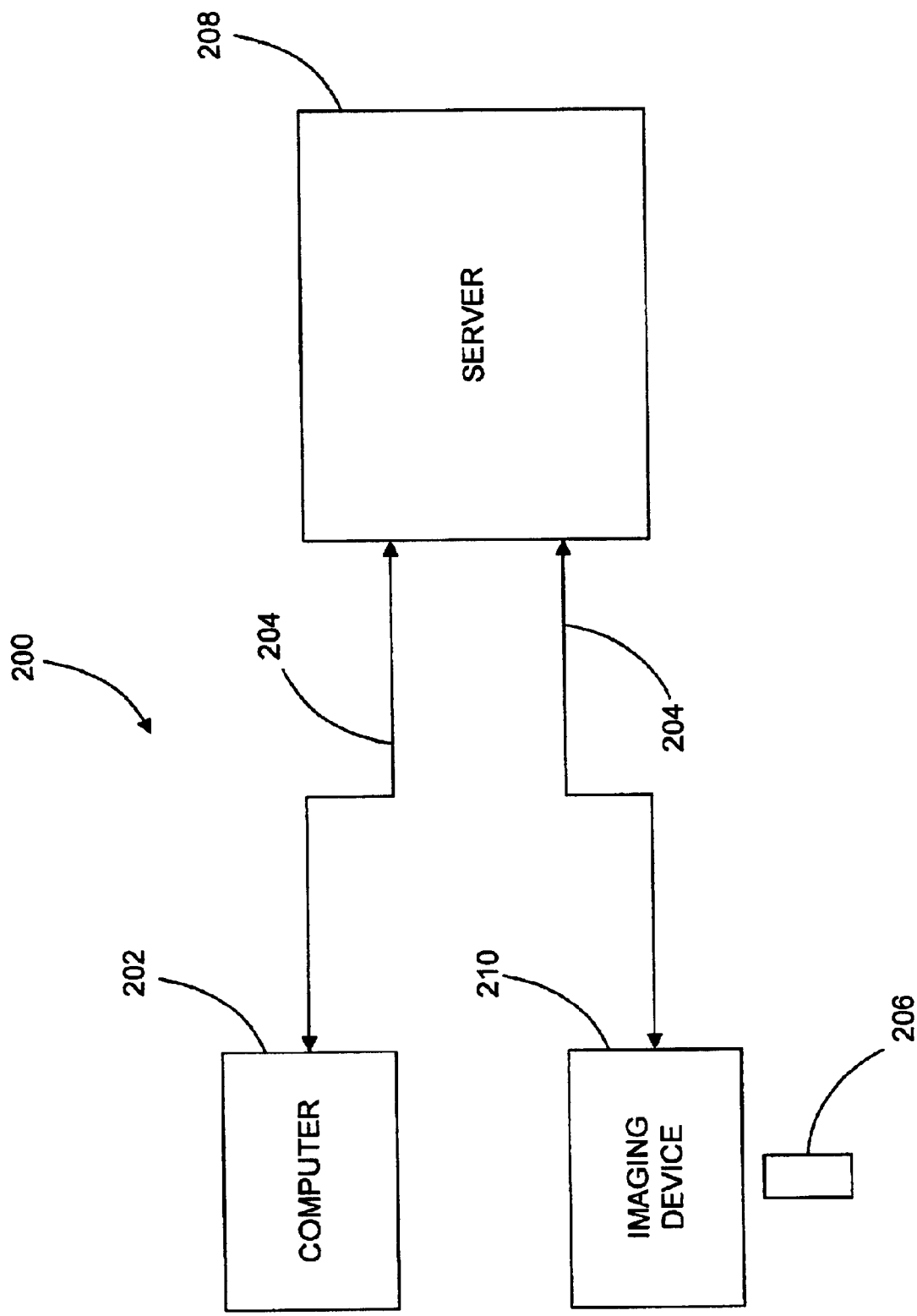

Shown in FIG. 3 is a simplified block diagram of a second embodiment of the ticket generating apparatus.

Figure 4:
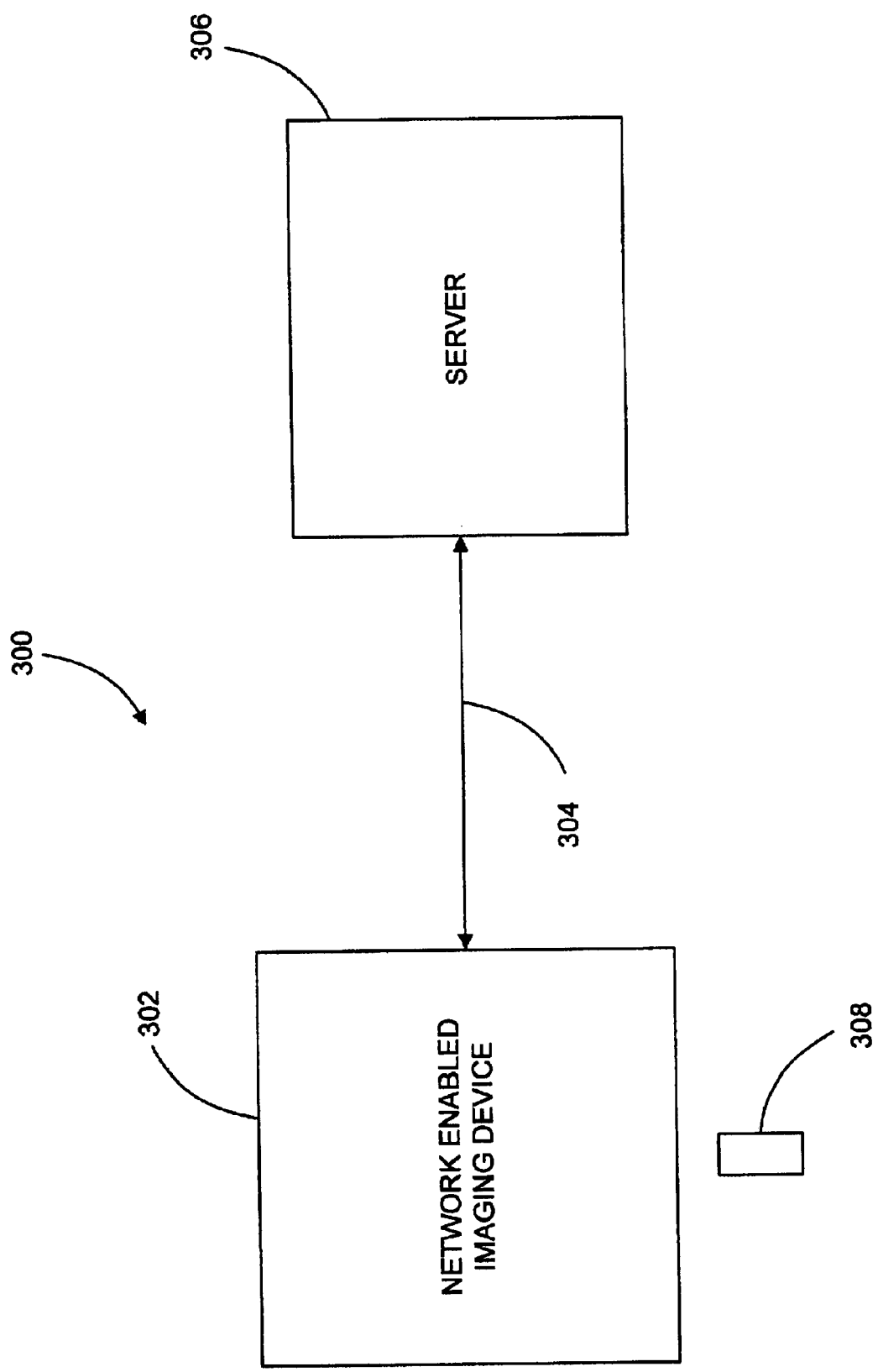

Shown in FIG. 4 is a simplified block diagram of a third embodiment of the ticket generating apparatus.

Figure 5:
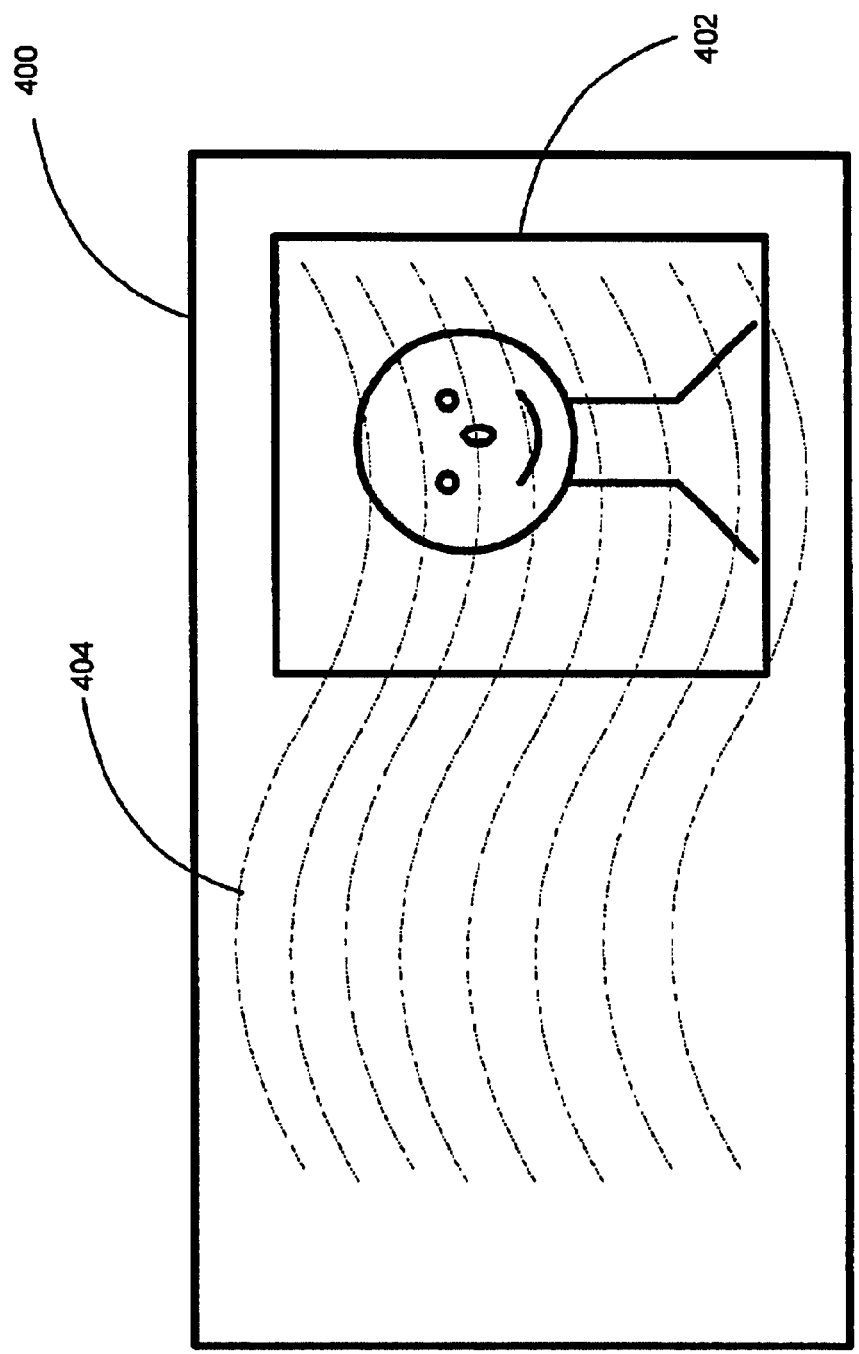

Shown in FIG. 5 is a representation of an exemplary ticket that could be generated by an embodiment of the ticket generating apparatus.

Figure 6:
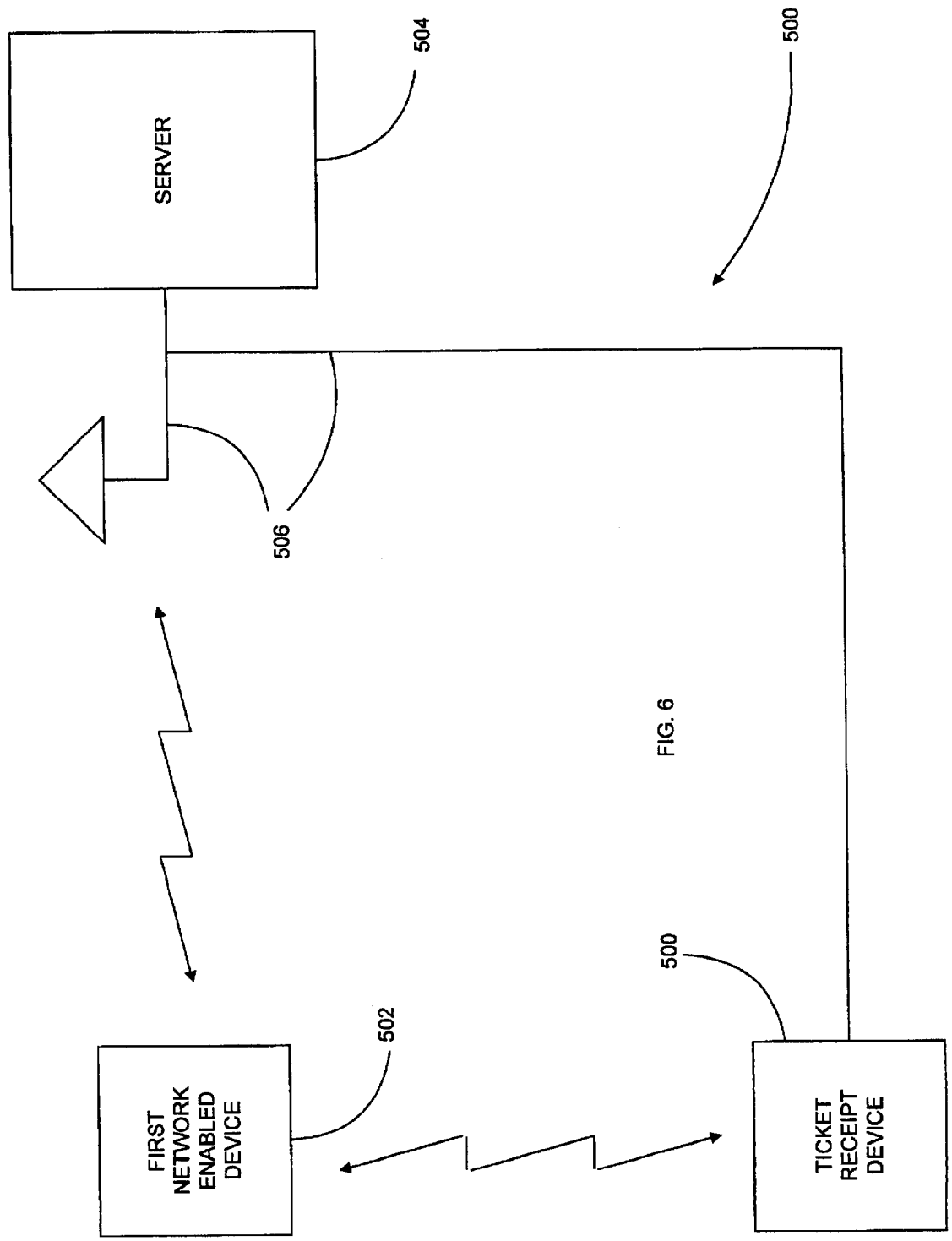

Shown in FIG. 6 is a simplified block diagram of a fourth embodiment of a ticket generating apparatus.

DETAILED DESCRIPTION OF THE DRAWINGS

Although embodiments of the ticket generating apparatus will be discussed in the context of operation over a network such as the Internet, it should be recognized that embodiments of the ticket generating apparatus could be used with other types of networks, such as local area networks.

To improve the convenience of securing tickets authorizing attendance at events, those who wish to attend the events could purchase the tickets over a network, such as the Internet. After completing the purchase portion of the transaction, data corresponding to the ticket is sent to the user over the Internet. The data is used by hardware in the possession of the user to generate a hard copy of the ticket. For example, the user prints a hard copy ticket corresponding to the data. The hard copy of the ticket is used by the ticket owner to gain access to an event. A potential problem with this type of system is the possibility for unauthorized users to gain access by using copies of the ticket issued to the ticket owner. Copies of the ticket issued to the ticket owner could be generated by using a photocopier machine or by printing multiple copies from the data supplied to the ticket purchaser.

The data sent to the ticket purchaser typically includes some logo associated with the event to which the ticket corresponds, the name of the event, the date and time of the event, and the location of the event. However, the data does not typically include information that can definitively identify the ticket purchaser. As a result, for the purchase of tickets to events at which there is not assigned seating, multiple copies of the ticket could be made and used to allow those who have purchased a ticket to gain admission to the event.

To reduce the likelihood of a purchaser producing multiple copies of the ticket and using these multiple copies to allow unauthorized persons to gain admission to events, a picture of the ticket purchaser is integrated into the hard copy of the ticket. A ticket having an image of the ticket purchaser included within the ticket will allow those controlling the admissions at events to quickly and easily verify that the ticket holder is the rightful ticket owner. Furthermore, by integrating an image of the ticket purchaser into the hard copy of the ticket, the task of making copies that could permit unauthorized persons to gain access into the event corresponding to the ticket is complicated.

Figure 1:
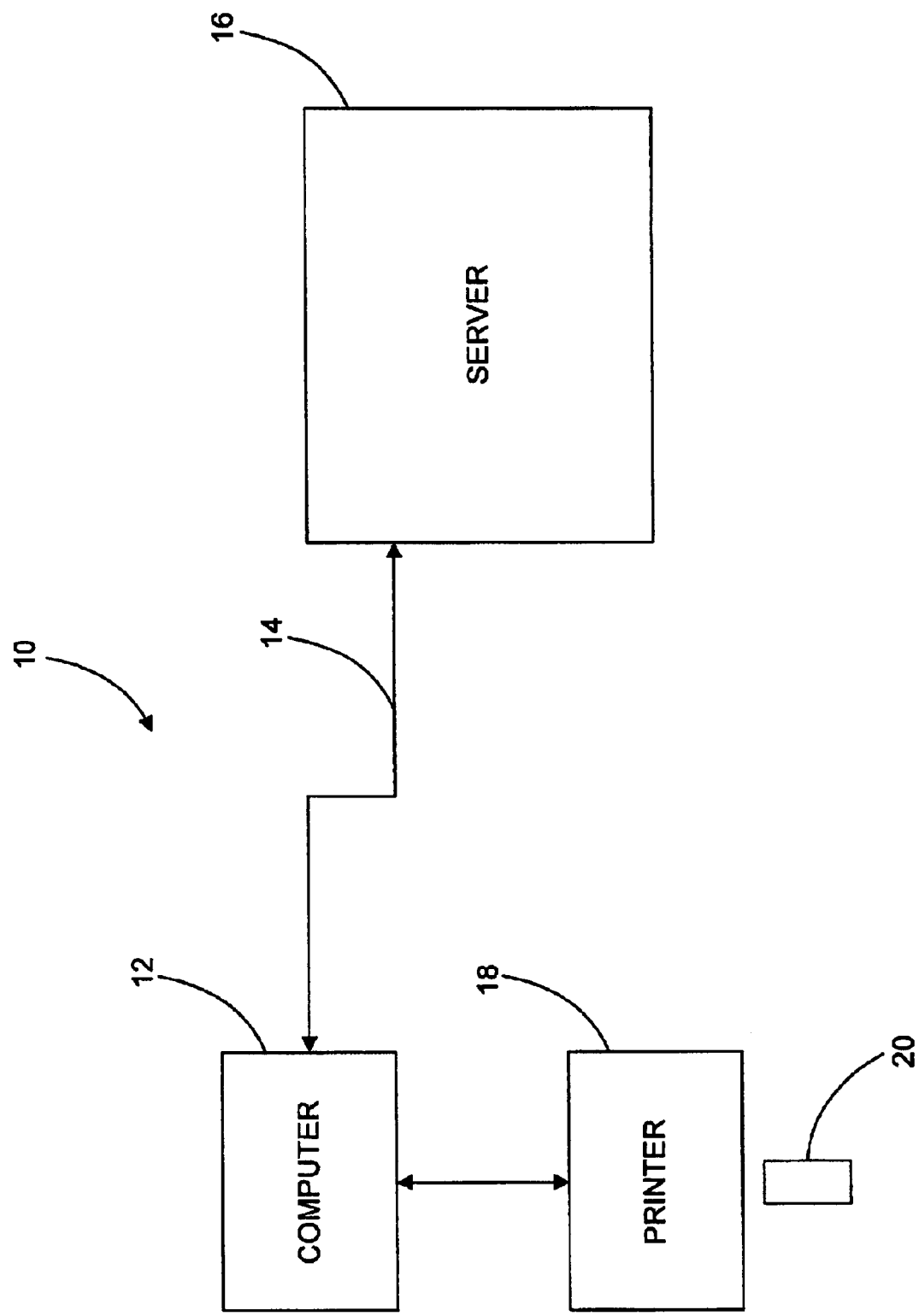

Shown in FIG. 1 is a block diagram of a first embodiment of the ticket generating apparatus, electronic ticket system 10. Electronic ticket system 10 includes a network enabled device, such as computer 12 coupled to a kind of network such as Internet 14. Another network enabled device, such as server 16, is also coupled to Internet 14. Server 16 performs the functions necessary to conduct the ticket purchase transaction. An imaging device, such as printer 18, is coupled to computer 12. Printer 18 is used to generate ticket 20 corresponding to the data delivered over Internet 14.

Shown in FIG. 2 is a high level flow diagram of a method for using the electronic ticket system 10 to purchase and receive data corresponding to a ticket. First, in step 100, a purchaser accesses the website of a ticket vendor. Then, in step 102, the purchaser performs the purchasing operation. Performing the purchase operation may include, for example, selecting an event to attend from a list of available events, entering payment option information (e.g. credit card information), and confirming the event selection and the decision to purchase a ticket. Next, in step 104, server 16 sends a request to computer 12 for image data. The image data corresponds to a picture of the purchaser. There are several ways in which computer 12 could process the request for image data from server 16. In a first possible way, computer 12 would be configured to search for a predetermined image data file name in a default directory. For this option, the image data would have been previously located in the directory by the ticket purchaser. If the predetermined image data file is not present in the default directory, then the purchaser would be prompted to enter the path to the correct image data. In a second possible way, computer 12 would be configured to prompt the purchaser to enter the path to the correct image data.

If the purchaser previously purchased a ticket from the ticket vendor, server 16 could have stored the previously submitted image data (with permission from the purchaser) for the purchaser in memory used by server 16. When the purchaser identifies themselves during the purchasing operation, server 16 would use the previously stored image data for the image portion of the data used to generate the hard copy of ticket 20.

In step 106, server 16 integrates the image data into the text and graphics data for ticket 20 to generate the data for ticket 20. This text and graphics data could include information such as the name of the event, a logo associated with the event, the time of the event, the location of the event, and background graphics such as a watermark. The image data could be integrated into the text and graphics data in a way that makes it more difficult to generate copies of ticket 20 with images of different people. For example, the data corresponding to the background graphics could be interleaved with the image data to significantly complicate the generation of unauthorized copies by photocopying methods. Another way in which to integrate the image data with the background graphics data could make use of an image processing operation in which, pixel by pixel, the image data and the background graphics data were combined to generate a distinct visual effect resulting from the combination of the background graphics data and the image data.

In step 108, server 16 sends the data for ticket 20 to computer 12 over Internet 14. Then, in step 110, computer 12 initiates a printing operation using printer 18. Finally, in step 112, printer 18 generates ticket 20.

Another alternative would make use of a digital watermark placed onto ticket 20. The digital watermark is unique to the particular ticket 20 issued to a purchaser. At an entrance gate to the event, ticket 20 is scanned by an Internet enabled ticket scanning device. The ticket scanning device is coupled to server 16 through Internet 14. The ticket scanning device would determine whether ticket 20 has been previously tendered at an entrance gate. If ticket 20 with this digital watermark has previously been tendered, then entry into the event would be denied. If ticket 20 with this digital watermark has not previously been tendered at an entrance gate, then entry into the event would be permitted and server 16 would record the usage of ticket 20 with the particular digital watermark.

Shown in FIG. 3 is a second embodiment of the ticket generating apparatus, electronic ticket system 200. In electronic ticket system 200, the purchaser initiates the ticket purchase transaction using a first network enabled device, such as computer 202 coupled to a network, such as Internet 204. Transaction of the ticket purchase and generation of the data for ticket 206 is performed in a second network enabled device, such as server 208. The data for ticket 206 is sent over Internet 204 to a third network enabled device, such as imaging device 210. Using the data generated by server 208, imaging device 210 generates ticket 206 including an integrated image of the purchaser. Because in this second embodiment of the ticket generating apparatus the data for ticket 206 is delivered directly over Internet 204 to imaging device 210, it is somewhat more difficult for the typical purchaser to capture the data for the purpose of generating unauthorized copies of ticket 206.

Shown in FIG. 4 is a third embodiment of the ticket generating apparatus, electronic ticket system 300. In electronic ticket system 300, the purchaser initiates the ticket purchase transaction using first network enabled device 302 coupled to a network, such as Internet 304. A second network enabled device, such as server 306, processes the purchase transaction and delivers data for ticket 308 to first network enabled device 302. In electronic ticket system 300, first network enabled device 302 includes an imaging device to generate ticket 308 including an integrated image of the purchaser.

Shown in FIG. 5 is a drawing of exemplary ticket 400 that might be generated by any of the embodiments of the ticket generating apparatus. Represented on ticket 400 (in a simplified fashion) is photograph 402 of the ticket purchaser and graphics forming watermark 404. It should be recognized that although some embodiments of the ticket generating apparatus form the purchaser's image interleaved with graphics on the ticket, other embodiments of the ticket generating apparatus could be configured to form the purchaser's image on the ticket without interleaved graphics.

Shown in FIG. 6 is a block diagram of a fourth embodiment of a ticket generating apparatus, electronic ticket system 500. In electronic ticket system 500, the ticket purchaser initiates the ticket purchase transaction using first network enabled device 502. First network enabled device 502 includes a configuration to transmit and receive information in a wireless mode to and from a second network enabled device, such as server 504, using a network, such as Internet 506. Alternatively, first network enabled device could receive and transmit information to and from server 504 through a direct electrical connection to Internet 506. First network enabled device 502 could include, for example, a personal digital assistant with wireless capability or a wireless phone. Server 504 processes the purchase transaction and delivers data for an electronic representation of a ticket to first network enabled device 502. The data for the electronic representation of the ticket is stored with first network enabled device 502.

To gain access to the event, the ticket purchaser (or, in general, the individual in physical possession of first network enabled device 502) delivers the data for the electronic representation of the ticket from first network enabled device 502 to a third network enabled device, such as ticket receipt device 508. Ticket receipt device 508 is configured to send and receive information through Internet 506 to and from server 504. First network enabled device 502 includes the capability to download the data for the electronic representation of the ticket to ticket receipt device 508. The downloading operation could be performed through a direct electrical connection or through a wireless connection. Using the data for the electronic representation of the ticket, ticket receipt device 508 contacts server 504 and verifies the authenticity of the data representing the electronic ticket. In addition, server 504 determines whether others have previously gained access to event using the data for the electronic representation of the ticket. If access has been previously granted with that data, then access will be denied for the individual seeking access to the event. If access has not been previously granted, then access is granted and server 504 records the granting of access for the data.

Although embodiments of the ticket generating apparatus have been illustrated, and described, it is readily apparent to those of ordinary skill in the art that various modifications may be made to these embodiments without departing from the scope of the appended claims.

What is claimed is:

1. A method of generating a ticket comprising:

sending data corresponding to an image of a person from a network enabled imaging device, directly coupled to a network, to a network enabled device using a network;

generating ticket data with the network enabled device using the data corresponding to the image;

sending the ticket data from the network enabled device to the network enabled imaging device; and forming the ticket, including the image, with the network enabled imaging device using the ticket data.

2. The method as recited in claim 1 wherein:

the network enabled device includes a server; and the network enabled imaging device includes a printer.

3. The method as recited in claim 2 wherein:

generating the ticket data includes integrating graphics with the image.

4. The method as recited in claim 3 wherein:

the graphics include a watermark corresponding to identification data associated with the ticket.

5. A ticket generating apparatus for use with a network, comprising:

a network enabled device coupled to the network and arranged to send ticket data to the network, with the ticket data including data corresponding to an image of a person; and a network enabled imaging device directly coupled to the network, configured to send the data corresponding to the image of the person to the network enabled device, arranged to receive the ticket data through the network, and configured to form a ticket on media including the image.

6. The ticket as recited in claim 5, wherein:

the network enabled device includes a server.

7. The ticket generating apparatus as recited in claim 6, wherein:

the server includes a configuration to generate the ticket data including graphics data integrated with the image.

8. The ticket generating apparatus as recited in claim 6, wherein:

the graphics include a watermark corresponding to identification data associated with the ticket.

* * * * *